United States Patent
Della-Libera et al.

(10) Patent No.: US 6,704,745 B2
(45) Date of Patent: Mar. 9, 2004

(54) TRANSFORMING DATA BETWEEN FIRST ORGANIZATION IN A DATA STORE AND HIERARCHICAL ORGANIZATION IN A DATASET

(75) Inventors: Giovanni M. Della-Libera, Seattle, WA (US); Patrick M. Dengler, Redmond, WA (US); Anders Hejlsberg, Seattle, WA (US); Bradford H. Lovering, Seattle, WA (US); John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 09/734,385

(22) Filed: Dec. 11, 2000

(65) Prior Publication Data

US 2003/0023609 A1 Jan. 30, 2003

(51) Int. Cl.[7] .............................................. G06F 17/30
(52) U.S. Cl. ..................... 707/103 R; 707/6; 707/102
(58) Field of Search ........................... 707/1, 2, 6, 100, 707/101, 102, 103 R, 103 Z

(56) References Cited

U.S. PATENT DOCUMENTS

| | | | | |
|---|---|---|---|---|
| 5,295,256 A | * | 3/1994 | Bapat | 717/137 |
| 5,864,858 A | * | 1/1999 | Matsumoto et al. | 707/100 |
| 6,014,670 A | * | 1/2000 | Zamanian et al. | 707/101 |
| 6,161,103 A | * | 12/2000 | Rauer et al. | 707/4 |
| 6,411,922 B1 | * | 6/2002 | Clark et al. | 703/2 |

OTHER PUBLICATIONS

Anderson, J.M., et al., "Continuous Profiling: Where Have All the Cycles Gone?", *SRC Technical Note—1997–016a*, 1–20, (Jul. 28, 1997).

Dean, J., et al., "Profile Me: Hardware Support for Instruction–Level Profiling on Out–of–Order Processors", 12 Pages, (1997).

* cited by examiner

*Primary Examiner*—Diane D. Mizrahi
(74) *Attorney, Agent, or Firm*—Woodcock Washburn LLP

(57) ABSTRACT

Data is separated from source. Datasets store tables of data and a graph of the relationships between the tables. The relationship can change at any time. The relationships are described by metadata that describe primary key, foreign key, and lookups, and other relationships between tables. In one embodiment, the tables of data are typed columns of data. The dataset also includes information on the rowstate and differential preservation, therefore, the source does not need to manage states of the data access. Adapters abstract the interface to datasets. More specifically, adapters manage the input/output to the datasets of the tables of data and the relationships. Adapters can be specialized in their purpose, such as an adapter for OLE data or XML data or generalized in their purpose. Furthermore, a composite adapter is specialized for the purpose of interacting with other adapters. Adapters manage the connection to the dataset and the name of the server that hosts the dataset. Data hoisting is implemented, in which the fluid relationship of data is changed in response to current data needs.

3 Claims, 10 Drawing Sheets

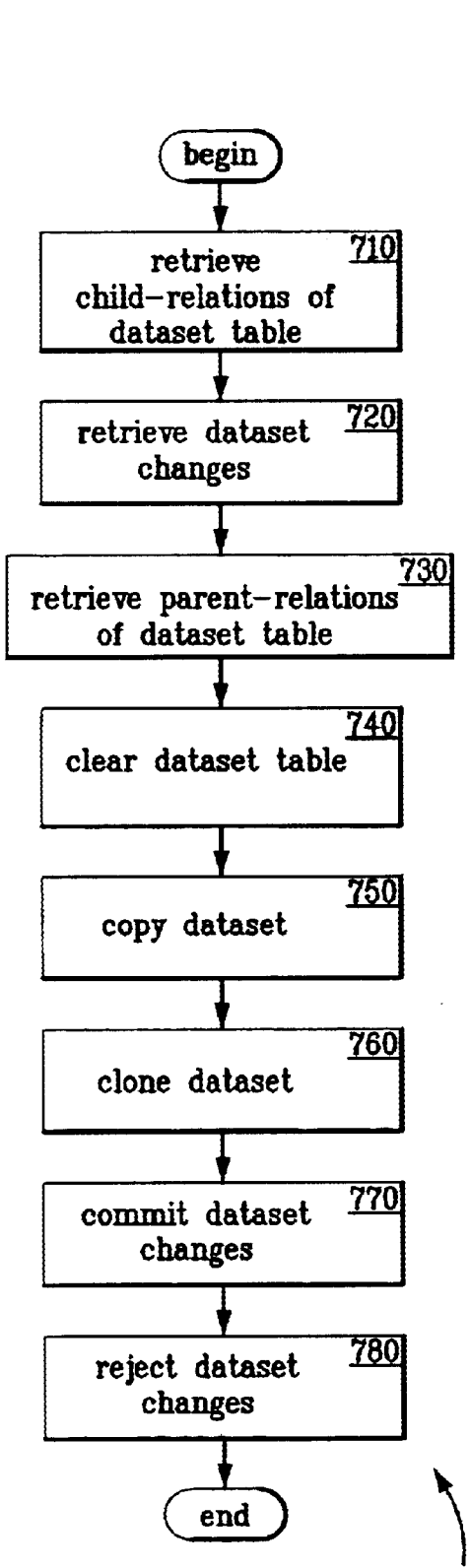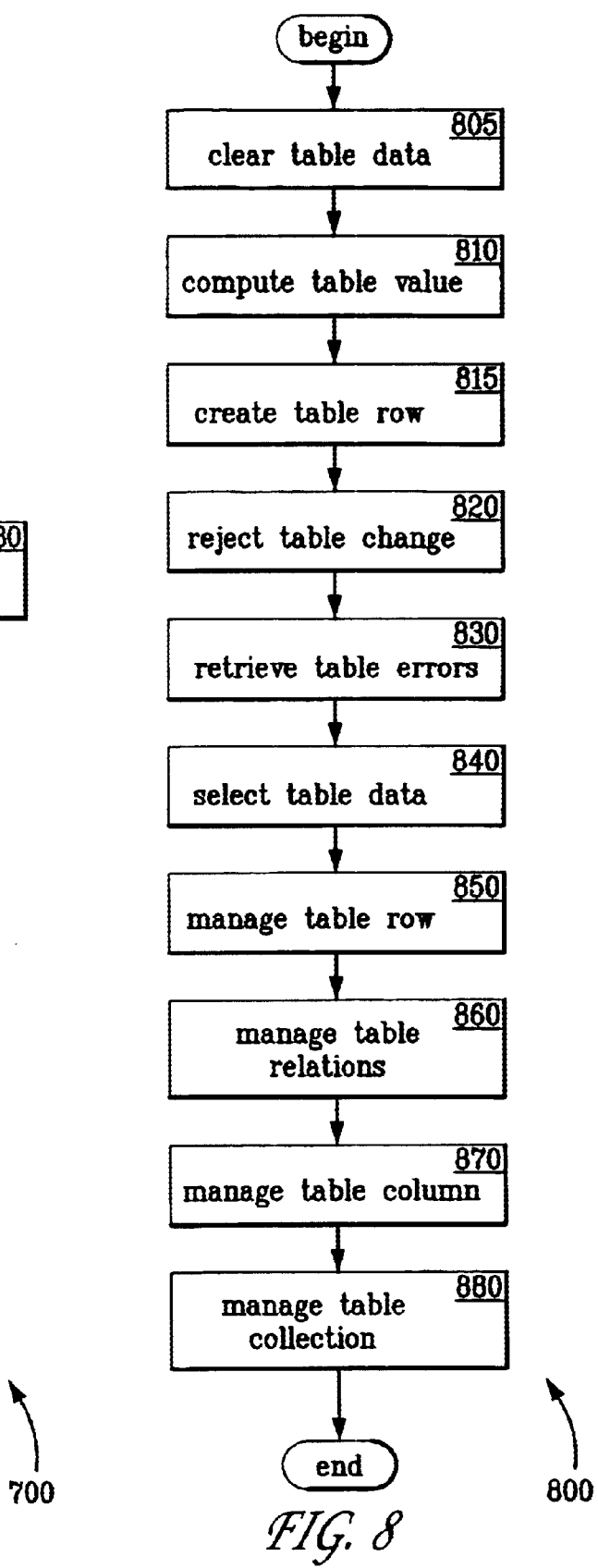
FIG. 7
FIG. 8

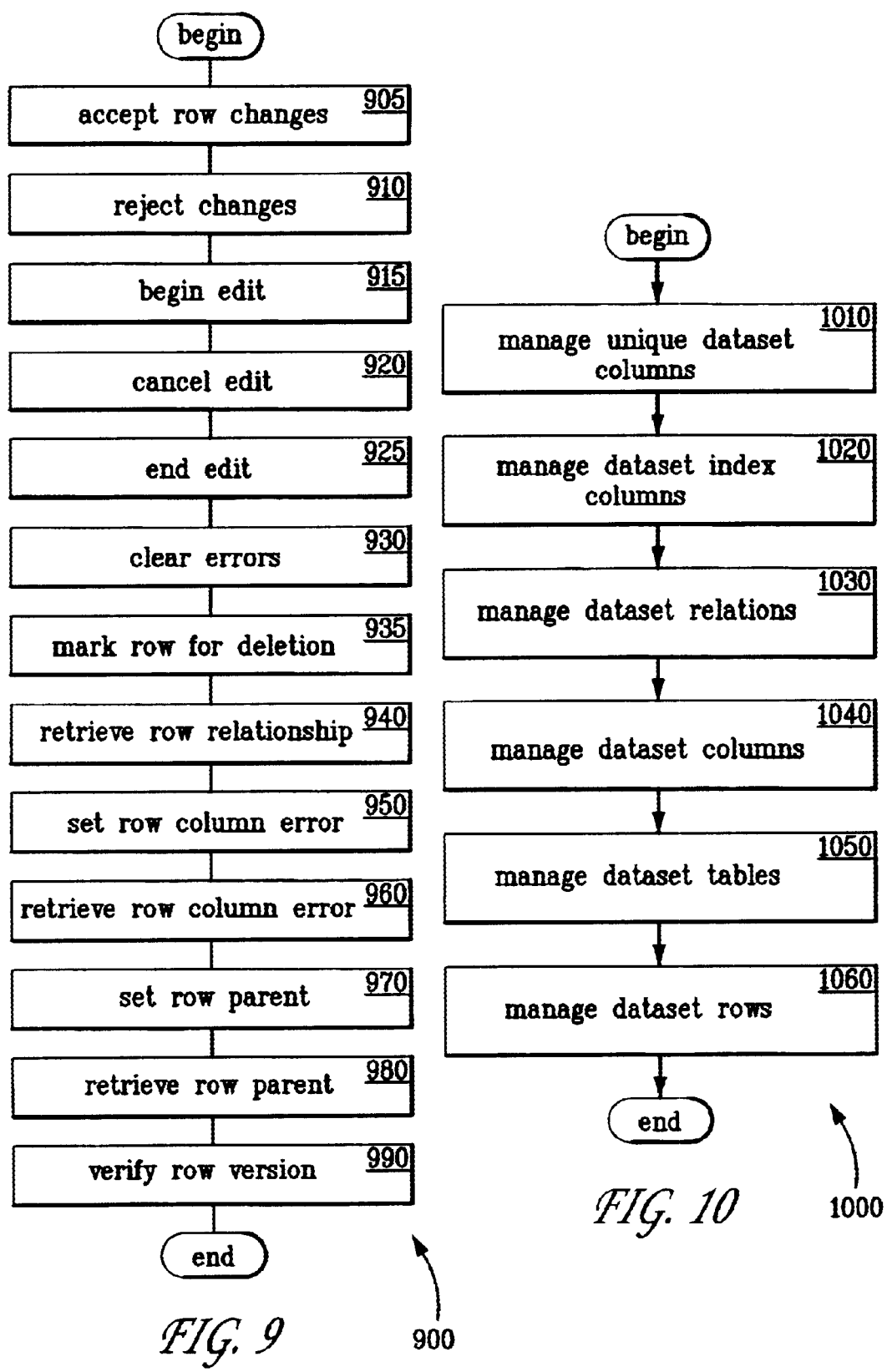
FIG. 9    900
FIG. 10    1000

| data column object | 1610 |
|---|---|
| data row object | 1620 |
| data key object | 1630 |

*FIG. 16*  1600

| Error object | 1710 |
|---|---|
| item object | 1720 |
| row-state object | 1730 |
| table object | 1740 |

*FIG. 17*  1700

| | |
|---|---|
| Column-name object | 1805 |
| auto-increment object | 1810 |
| auto-increment seed object | 1815 |
| auto-increment step object | 1820 |
| data-type object | 1825 |
| default-value object | 1830 |
| Caption object | 1835 |
| ordinal object | 1840 |
| allow-null object | 1845 |
| read-only object | 1850 |
| Maximum-length object | 1855 |
| table object | 1860 |
| unique object | 1865 |
| value-editor object | 1870 |
| sparse object | 1875 |
| expression object | 1880 |
| meta-data object | 1885 |

FIG. 18  1800

| | |
|---|---|
| dataset-belongs object | 1910 |
| display-expression object | 1920 |
| has-errors object | 1930 |
| minimum-capacity object | 1940 |
| indexed-columns object | 1950 |
| table-name object | 1960 |
| meta-data object | 1970 |
| unique column object | 1980 |

FIG. 19  1900

| name object | 2010 |
| --- | --- |
| case-sensitive object | 2020 |
| has-errors object | 2030 |
| locale object and | 2040 |
| metadata object | 2050 |

2000

| all object | 2110 |
| --- | --- |
| count object | 2120 |
| item object | 2130 |

2100

| relation-name object | 2210 |
| --- | --- |
| constraint-enforce object | 2220 |
| parent-table object | 2230 |
| child-table object | 2240 |
| parent-columns object | 2250 |
| child-columns object | 2260 |
| cascade object | 2270 |

2200

TRANSFORMING DATA BETWEEN FIRST ORGANIZATION IN A DATA STORE AND HIERARCHICAL ORGANIZATION IN A DATASET

FIELD OF THE INVENTION

This invention relates generally to database managers, and more particularly to database access data in a distributed environment.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, Microsoft Corporation, All Rights Reserved.

BACKGROUND OF THE INVENTION

In conventional database technology, the database management components are designed to support a continuous open connection between client and server. However, a continuous open connection is not well-suited to a message-based loosely-coupled network, such as the Internet, where knowledge of state information by the client, by the server and by intermediate tiers, is unneeded.

Conventional technologies use core application programming interfaces (APIs), a set of routines used by an application program, to direct the performance of procedures of a database manager. More specifically, conventional database API technologies include Open Database Connectivity (ODBC) created by the SQL Access Group and Java Database Connectivity JDBC that support basic Structure Query Language (SQL) functionality in which a connection is established having various states associated with the connection, a cursor is used to query data, and a result set is obtained. In JDBC and object-oriented versions of ODBC, a connection object is used to manage the connection, and the state of the connection is attributes/properties/data of the object.

Another conventional technology of state-dependent data access is sockets. A socket is a means of communicating between a client program and a server program in a network. A socket is defined as "the endpoint in a connection." Sockets are created and used with a set of programming requests or "function calls" sometimes called the sockets API. The conventional technology of database access APIs is problematic because the APIs are full-featured APIs, analogous to the instruction set of complex instruction set computer (CISC), which has large overhead in the size of the program code and in the speed of processing. Conventional APIs are used in narrow limited scopes, such as using the API to retrieve data from a database into an array in the client, use or modify the data in the client, and then store a portion of the data in the database. In conventional database access, a full-featured A.P.I. is implemented by the DBMS and the client, but usually is unused. Conventional APIs are not used in the full scope of the purpose of the APIs.

Furthermore, conventional database access in multiple tiered architectures is static and state dependent. For example, in database access across the Internet, at least three tiers are involved, the client, a web server, and a content server (e.g. database server). Furthermore, the presentation of data is static because the middle tier, the web server, receives requested data from the database server and transforms the data for presentation by the client. In multiple tier architectures, there is no direct connection between the first tier (e.g. the client) and the last tier (e.g. the database server). Nonetheless, the intermediate tiers (e.g. web server) maintain state information on the connections to the other tiers (e.g. the connection between the client and the web server and the connection between the web server and the database server). However, the requirement of maintaining state information is burdensome and problematic when scaling the web servers to accommodate different configurations and throughput requirements. Furthermore, conventional data architecture is based on hierarchy in which data items are structured in a tree, with parent items and child items. However conventional database architecture is based on relations, which is inconsistent with data architecture. Therefore, implementing data architecture and database architecture required additional design and programming to reconcile appropriately.

SUMMARY OF THE INVENTION

The above-mentioned shortcomings, disadvantages and problems are addressed by the present invention, which will be understood by reading and studying the following specification.

The present invention encompasses an object that communicates with a data store, such as a database manager that has a schema, through a data access model, and that communicates with a data set, in which the data is factored out of a programming model. The data set has no information on the schema, rather the schema information is present in the object, and the object acts as an interface between the schema of the data store, and the data set.

In one aspect of the present invention, where the object, referred to as an adapter, is implemented on a webserver, and where a dataset is implemented on a client connected to the webserver, the client needs no knowledge of the state of the database or the schema of the database. Therefore, the client interacts with the webserver without the burden of interacting under the constraints of the database state or schema. As a result, programming database access in the client is simplified. Furthermore, the elimination of state-awareness on the part of the client provides an architecture that is more easily scalable. A dataset is a collection of related information composed of separate elements that can be treated as a unit.

Another aspect of the invention is a method for managing data that includes receiving a dataset, inferring a typed data set accessor from the dataset, and managing a data store using the typed data set accessor. Another method for managing data includes generating a dataset by factoring data from an associated programming model. More specifically, the method includes managing a plurality of tables in the dataset and managing a graph of a relationship of the tables in the dataset. In yet another embodiment of the present invention, a method for managing a dataset includes constructing the dataset and merging the dataset with another dataset.

Still another aspect of the present invention is a computer-readable medium with a dataset data structure thereon, in which the dataset includes at least table object and at least one table relationship object.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 7 is a flowchart of a method of additional actions in the management of a dataset of the method shown in FIG. 6, to be performed by an adapter, according to an exemplary embodiment of the invention;

FIG. 8 is a flowchart of a method of an additional action of managing a table of the dataset, to be performed by an adapter, according to an exemplary embodiment of the invention;

FIG. 9 is a flowchart of a method of managing a row of the table of the dataset, to be performed by an adapter, according to an exemplary embodiment of the invention;

FIG. 10 is a flowchart of a method of additional actions in the management of a dataset of the method shown in FIG. 6, to be performed by an adapter, according to an exemplary embodiment of the invention;

FIG. 16 is a diagram of a table data structure in a dataset for use in an exemplary implementation of the invention;

FIG. 17 is a diagram of a data row object for use in an exemplary implementation of the invention;

FIG. 18 is a diagram of a data column object for use in an exemplary implementation of the invention;

FIG. 19 is a diagram of additional table data structure in a dataset for use in an exemplary implementation of the invention;

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, an implementation of the invention is described. Finally, in the fifth section, a conclusion of the detailed description is provided.

Hardware and Operating Environment

Figure 1:
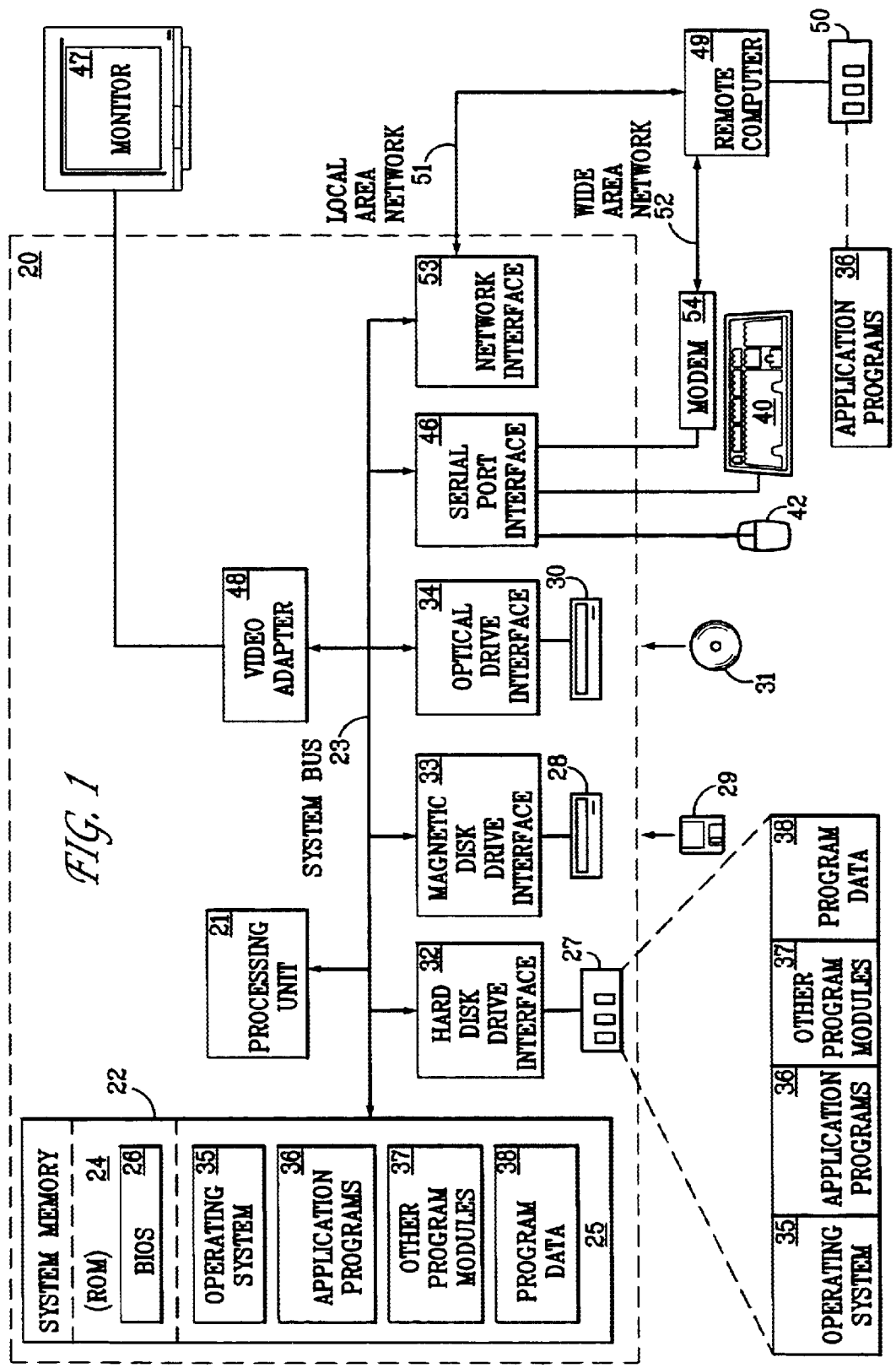
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIG. 2.

The system 200 includes a data store 210, having data architected in an organization. In one embodiment, the data store 210 has a database management system (DBMS) and the organization is relational. A first adapter 220 communicates with the data store 210, for retrieving and sending data to the data store 210. A dataset 230 communicates with the first adapter 220. The dataset 230 organizes data in a hierarchy. The dataset 230 has no information on the first organization of the data of data store 210.

The first adapter 220 transforms the data between the organization of the data store 230 and the hierarchical organization of the dataset 210. The data store 210 has no information on the dataset. The data is retrieved from the data store 230 by the first adapter 220, and the data is pushed from the first adapter to the dataset.

In another embodiment, a second adapter (not shown) is coupled between the first adapter 220 and the data store 210. Furthermore, the first adapter 220 is operably coupled to the data store 210 through the second adapter (not shown). The first adapter 220 retrieves and sends data to the second adapter (not shown) and the second adapter transforms the data between the organization of the data store 210 and a native organization of the second adapter. The first adapter 220 transforms the data between the native organization of the second adapter and the hierarchical organization of the dataset 230.

The system level overview of the operation of an exemplary embodiment of the invention has been described in this section of the detailed description. A database schema is separated from the data, and the schema is implemented on an intermediary component, and the data is implemented on a client. While the invention is not limited to any particular schema, for sake of clarity a simplified schema has been described.

Methods of an Exemplary Embodiment of the Invention

In the previous section, a system level overview of the operation of an exemplary embodiment of the invention was described. In this section, the particular methods performed by the server and the clients of such an exemplary embodiment are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Figure 3:
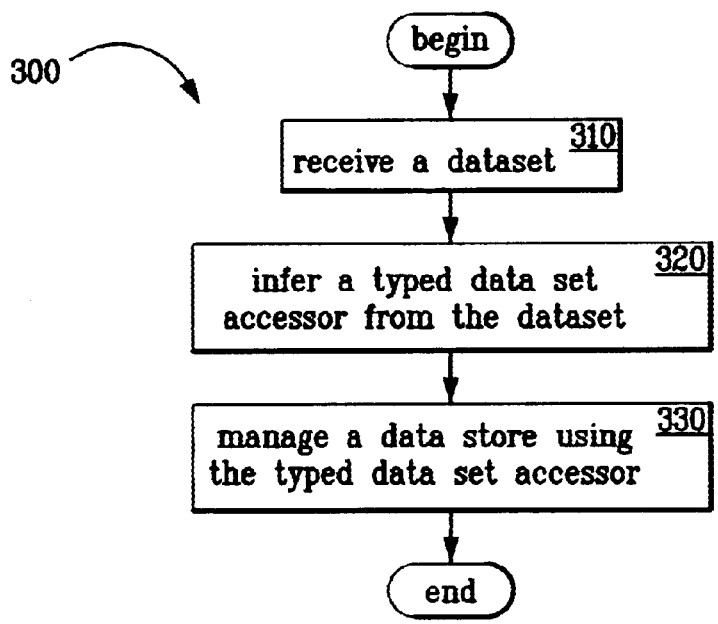
FIG. 3 is a flowchart of a method of managing data to be performed by an adapter according to an exemplary embodiment of the invention.

Referring first to FIG. 3, a flowchart of a method 300 of managing data to be performed by an adapter according to an exemplary embodiment of the invention is shown.

Figure 2:
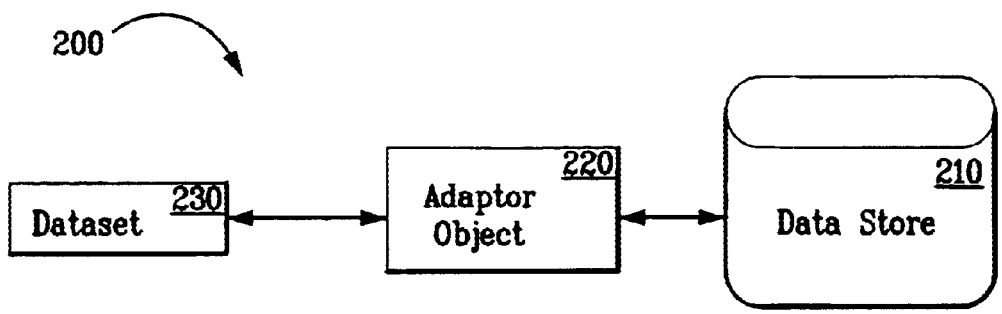
FIG. 2 is a diagram illustrating a system-level overview of an exemplary embodiment of the invention.

Method 300 includes receiving a dataset 310, such as dataset 230 in FIG. 2. In one embodiment, the dataset is received from a client. The dataset is expressly separated from the source of the data (e.g. the database). A dataset can live in the single tier, can live on the client tier of the two tier applications, and can travel throughout tiers in multi-tier applications. It is simply a buffer of data; a cache of data. Since it is separated from the source, there is no open method. There is no MoveNext. It does not virtualize data, it does not pull data. Data is pushed into the dataset by separating the source of the data from the data itself, the client is presented an always consistent, never ambiguous, access to the data. Changing data in the dataset does not rely on cursor type or lock type. It is simply an array.

Subsequently, the method includes inferring a typed data set accessor from the dataset 320. Thereafter, the method includes managing a data store 330 using the typed data set accessor and the schema of the data store.

Figure 4:
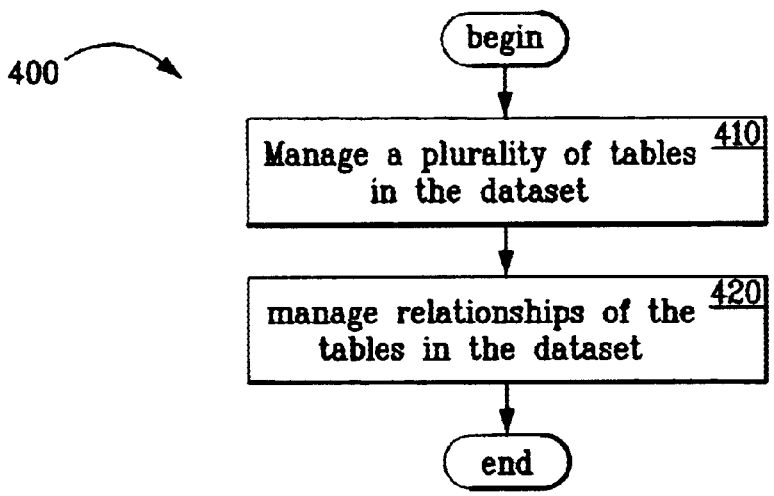
FIG. 4 is a flowchart of a method of additional actions in the managing data of the method shown in FIG. 3, to be performed by an adapter, according to an exemplary embodiment of the invention.

Referring next to FIG. 4, a flowchart of a method 400 of additional actions in the managing data of method 300, to be performed by an adapter, according to an exemplary embodiment of the invention is shown.

Method 400 includes managing a plurality of tables in a dataset 410. Method 400 also include managing a graph of a relationship of the tables in the dataset 420. In varying embodiments, action 410 is performed before, during, and after action 420. Furthermore, in varying embodiments, the actions of method 400 are performed after receiving a dataset 310 of method 300 in FIG. 3.

Figure 5:
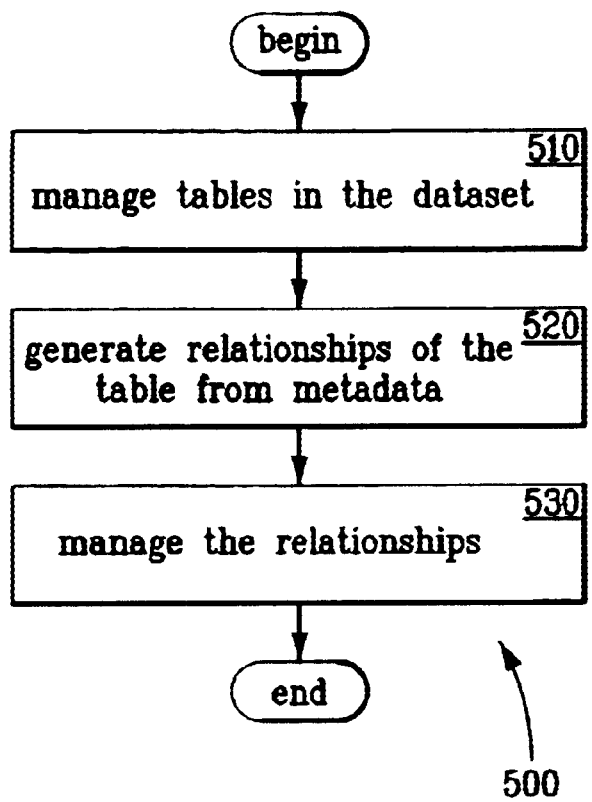
FIG. 5 is a flowchart of a method of generating a dataset by factoring data from an associated programming model according to an exemplary embodiment of the invention.

Referring next to FIG. 5, a flowchart of a method 500 of generating a dataset by factoring data from an associated programming model according to an exemplary embodiment of the invention is shown. In one embodiment, method 500 is managing is performed by an adapter.

Method 500 includes managing a plurality of tables in a dataset 510. The method optionally includes generating relationships of the tables 520. In one embodiment, the relationships are generated from metadata. The metadata describes the table. In another embodiment, the metadata describes data selected from the group consisting of primary key data, foreign key data, and lookup data.

Method 500 includes managing the relations of the dataset tables 530, such as managing a graph of a relationship of the tables in the dataset. In varying embodiments, managing tables 510 is performed before, between, during, and after generating relationships 520 and managing relationships 530.

In one embodiment, the managing further comprises storing. More specifically, method 500 includes managing tables 510 and managing relationships 520 includes storing tables and storing relationships, respectively. One embodiment of storing tables includes pushing data from the tables to a dataset. Another embodiment of storing tables includes pushing data from the tables to a dataset on a client. Pushing further comprises sending to a client without the client requesting it.

In one embodiment, the managing further comprises retrieving. More specifically, method 500 includes managing tables 510 and managing relationships 520 includes retrieving tables and retrieving relationships, respectively.

Figure 6:
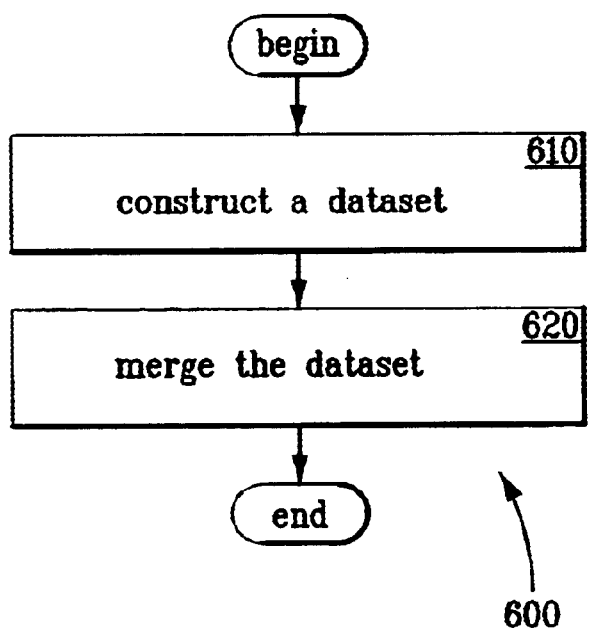
FIG. 6 is a flowchart of a method of managing a dataset according to an exemplary embodiment of the invention.

Referring next to FIG. 6, a flowchart of a method 600 managing a dataset according to an exemplary embodiment of the invention is shown.

Method 600 includes constructing the dataset 610. In one embodiment, constructing includes allocating memory for the dataset and initializing values of the dataset. Method 600 also includes merging the dataset 620. In one embodiment, merging includes merging a table of the dataset. In another embodiment, merging includes merging a row of a table of the dataset. In yet another embodiment, merging includes matching by original PK values. For rows that match, the row state and original/current values of the existing row are replaced by the input row state and original/current values. For unmatched incoming rows, a new row is added to the existing dataset with the incoming row state and values and a new locally unique identification (LUID) is generated. Whenever a row is added to a dataset table, a LUID is generated for it. The LUID for each row, as well as the last unique LUID for a table, are marshaled through a component that uses Extensible Markup Language (XML) resources to the destination dataset. In still another embodiment of merging, constraint checking is deferred until the end of the merge, and then it is enforced on the current values.

In still yet another embodiment, merging 620 includes merging rows into an existing table if the predetermined or specified table name matches an existing table in the dataset, otherwise, the method will create a new table or columns, depending on the missingSchemaAction parameter. A CascadeAll parameter to the method indicates merging and/or copying of rows in related tables. A PreserveChanges parameter to the method, when set to true, the original row state stays intact. If it is set to false, the source overrides the originals. The following table 1 showing row state merge, when PreserveChanges paramter is set to true follows:

TABLE 1

| Existing | Incoming | | | |
| --- | --- | --- | --- | --- |
|  | O' | I | U | D |
| O | O' | * | U | D |
| I | * | I | * | * |
| U | U | * | U | U |
| D | D | * | D | D |

Where * indicates that the row is added with the current state and original and current values (i.e. no merge occurs), I represents insert, U represents update, D represents delete, and O represents original.

The following table 2 showing row state merge, when indication preserve-changes is set to false, follows:

TABLE 2

|          | Incoming |   |   |   |
|----------|---|---|---|---|
| Existing | O | I | U | D |
| O | O | * | U | D |
| I | * | I | * | * |
| U | O | * | U | D |
| D | O | * | U | D |

Furthermore, merging 620 is performed in the following sequence: deleted, modified and/or original, and new.

In still yet another embodiment of merging 620, a parameter indicating a missing schema action is set to "ADD", indicating the schema is added in the following sequence: table and column schema is added, relations are added, data is added, and then constraints are checked.

Referring next to FIG. 7, a flowchart of a method 700 of additional actions in the management of a dataset of method 600, to be performed by an adapter, according to an exemplary embodiment of the invention is shown.

Method 700 includes retrieving child relations of a table of the dataset 710, in which for a specified or predetermined table, a collection of relations for any tables that are considered children of the specified table is retrieved. The method also includes retrieving changes of the dataset 720. More specifically, the action retrieves a dataset of the changes that have occurred since the last commit, action 770. In one embodiment, predetermined information specifying adds, deletes, updates, unchanged, and/or errors is specified. Method 700 also includes retrieving parent-relations of a table of the dataset 730, in which a collection of relations for any tables that are a parent to a specified or predetermined table are retrieved. Method 700 includes clearing a table of the dataset 740, in which all data in a specified or predetermined table is initialized. Method 700 also includes copying the dataset. Existing data is a specified or predetermined dataset is copied into a new dataset. Method 700 includes cloning the dataset 760, which clones the schema of a specified or predetermined dataset without any copying any data into a new dataset. The method also includes committing changes to the dataset 770. The changes since the previous commit are saved. Method 700 includes rejecting changes to the dataset 780 which rolls back or reverts all of the changes to the entire dataset made since performance of the previous commit. Method 700 optionally includes managing a table of the dataset (not shown).

In varying embodiments, method 700 includes any combination of the actions of method 700. Method 700 may not include all actions.

Referring next to FIG. 8, a flowchart of a method 800 of an additional action of managing a table of the dataset, to be performed by an adapter, according to an exemplary embodiment of the invention is shown.

The method of managing a table 800 includes clearing data of the table 805, in which all data in a specified or predetermined table is cleared. The method also includes computing a value of the table 810, in which a specified filter is used in conjunction with a specified computation. The method also includes creating a row in a specified table 815.

The method also includes rejecting changes to the table 820, in which changes made since the last commit are rolled backed. The method also includes retrieving errors in the table 830. Furthermore, the method includes selecting data in the table 840.

Method 800 also includes managing a row of the table 850. More specifically, managing a row includes performing predetermined actions before a row has been changed, immediately prior to when a row has been changed, before a row has been changed, in response to a value in the row having been changed, and when a value in a row is absent.

Method 800 also includes managing a relation of the table 860, managing a column of the table 870 and managing a collection of the table 880. In varying embodiments, method 800 includes any combination of the actions of method 800. Method 800 may not include all actions.

Referring next to FIG. 9 a flowchart of a method 900 of managing a row of the table of the dataset, to be performed by an adapter, according to an exemplary embodiment of the invention is shown.

Method 900 includes accepting changes to the row 905 and rejecting changes to the row 910.

Method 900 also includes beginning editing the row 915 which suspends events for updating the row and pushes data into a proposed rowstate. Furthermore updates on each cell are not pushed into the row until editing the row is canceled 920 which cancels the update initiated by action 915 or editing the row is ended 925 which pushes data into rows that was suspended by action 915.

Method 900 also includes clearing errors of the row 930, which clears the row and column errors for a specified or predetermined row. Method 900 also includes marking the row for deletion which marks the row for deletion. The row will be deleted upon commit, or acceptance of row changes 905.

Method 900 also includes retrieving the row of a relationship 940.

The method also includes setting a column error of the row 950 and retrieving the column error of the row 960.

Method 900 also includes setting a parent row if the row 970, retrieving the parent row of the row 980, and verifying a version of the row 990.

Referring next to FIG. 10, a flowchart of a method 1000 of additional actions in the management of a dataset of method 600, to be performed by an adapter, according to an exemplary embodiment of the invention is shown.

Method 1000 includes managing a collection of unique-columns of the dataset 1010. A collection of unique-columns stores a collection of arrays of columns that represent uniqueness across rows. Managing includes adding, removing, clearing and generating an index of a collection of unique-columns.

Method 1000 also includes managing a collection of index-columns of the dataset 1020. An index-columns collection stores a collection of arrays of columns that can be efficiently searched using an index that is maintained on the collection. Managing includes adding, removing, clearing and generating an index of a collection of index-columns.

Method 1000 also includes managing a collection of relations the dataset 1030. A collection or relations carries the information to establish relationships between tables. Managing includes adding, removing, clearing and generating an index of a collection of relations.

Method 1000 also includes managing a collection of columns of the dataset 1040. The collection of columns is associated with a specified or predetermined table, and describes the type and schema of the column. Managing includes adding, removing, itemizing determining the object contained with, clearing and generating an index of a collection of columns.

Method 1000 also includes managing a collection of tables of the dataset 1050. Managing includes adding, removing, clearing, and generating an index of a collection of tables.

Method 1000 also includes managing a collection of rows of the dataset 1060. Managing includes adding, removing, clearing, retrieving a specific row in the collection via an index and generating an index of a collection of unique-columns.

Implementation

In this section of the detailed description, a particular implementation of the invention is described that is Internet-related.

Figure 11:
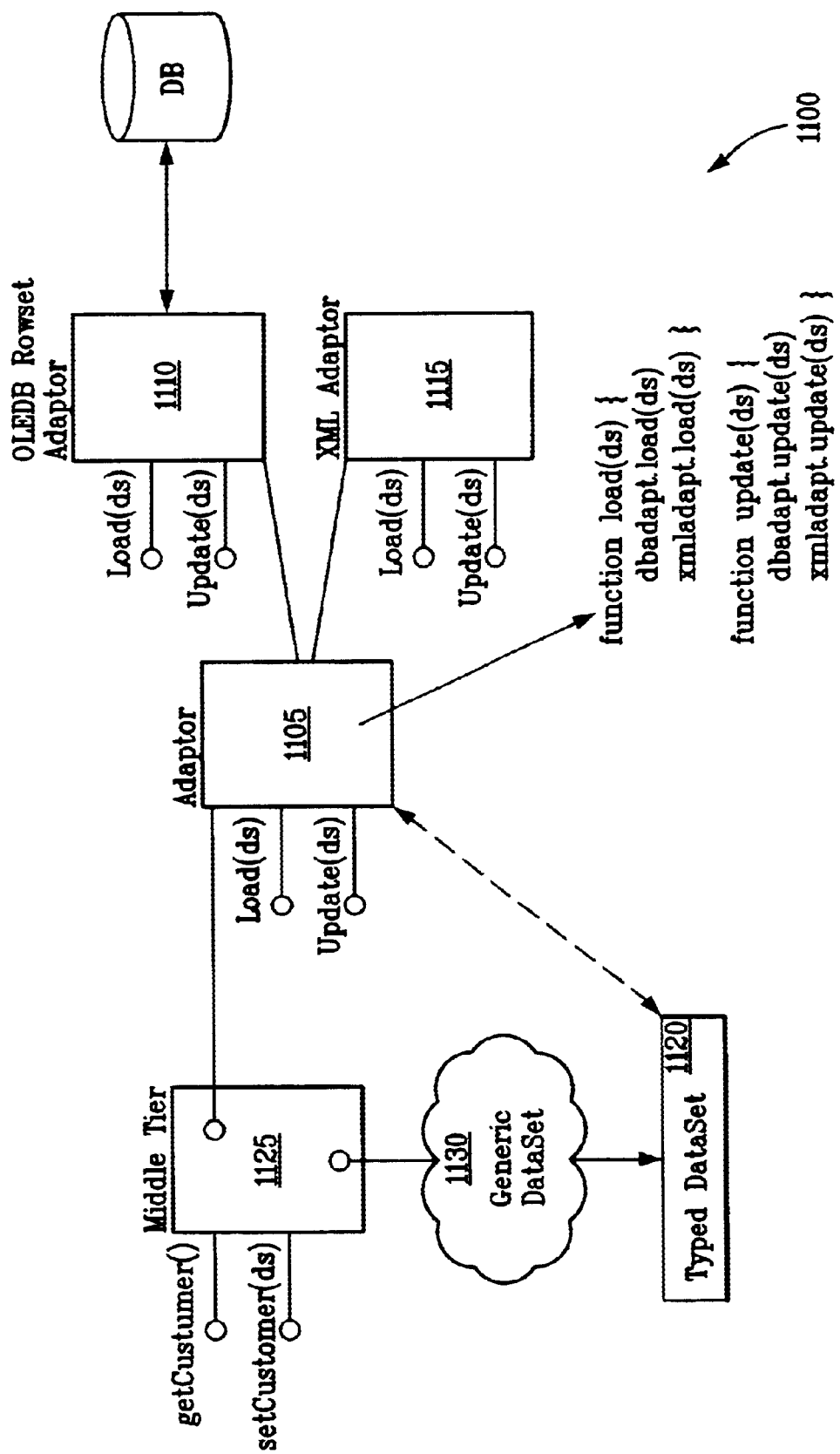
FIG. 11 is a block diagram of an apparatus according to an exemplary embodiment of the invention.

FIG. 11 is a block diagram of an apparatus 1100 according to an exemplary embodiment of the invention.

Dataset 1120 store tables of data and a graph of their relationships. Adapters, such as myadapter 1105, OLEDB Rowset Adapter 1110 and XML Adapter 1115, fill datasets with the data and their relations, and pull data from the dataset 1120. The dataset is a conduit between datasets and various sources.

Default adapters, OLEDB Rowset Adapter 1110 and XML Adapter 1115 can optionally be used standalone to fill datasets with data. An adapter provides one or more tables and their relations. Composite adapter, MyAdaptor 1105 uses both the OLEDBRowset Adapter 1110 and the XML Adapter 1115 to fill the dataset 1120. dataset 1120 is passed to the data adapter 1105 to be filled and reconciled. A composite adapter knows how to use the composed adapters to get the data in and out of the dataset. Additionally, composite adapter provides metadata to describe the relationships between the data. An adapter having provided the data and relationships can then infer a typed data set accessor. The metadata describes primary key, foreign key, lookups, and other relations between tables.

Through factored objects, the developer of client programs that use the dataset 1120 have increased control over the flow, type, and topology of data. Whereas in the past, specific default implementations (when and how to bring data down to the client, the source of the data) were difficult to code around, this model puts these decisions directly in the developers hands by specifically writing them in code each time.

An object that communicates with a data store, such as a database manager that has a schema, through a data access model, and that communicates with a data set, in which the data is factored out of programming model. The data set has no information on the schema, rather the schema information is present in the object, and the object acts as an interface between the schema of the data store, and the data set.

In one embodiment where the object, referred to as an adapter, is implemented on a webserver, and where a dataset is implemented on a client connected to the webserver, the client needs no knowledge of the database state or schema. Therefore, the client interacts with the webserver without the burden of interacting under the constraints of the database state or schema. As a result, programming database access in the client is simplified. Furthermore, the elimination of state-awareness on the part of the client provides an architecture that is more easily scalable. A dataset is a collection of related information composed of separate elements that can be treated as a unit.

Adapters, such as myadapter 1105, OLEDB Rowset Adapter 1110 and XML Adapter 1115, abstract the interface to datasets, such as Typed dataset 1120. More specifically, adapters manage the input/output to the datasets of the tables of data and the relationships of the tables. Adapters can be specialized in their purpose, such as an adapter for OLE data 1110 or XML data 1115 or generalized in their purpose, such as Middle Tier 1125. Furthermore, a composite adapter 1105 is specialized for the purpose of interacting with other adapters. Adapters manage the connection to the dataset and manage the name of the server that hosts the dataset.

In another embodiment of apparatus 1100, apparatus 1100 also includes an adapter 1105 operably coupled by a communication line to the data store 1130, for retrieving and sending data to the data store. The adapter 1105 is operably coupled to a dataset 1120. The dataset 1120 stores data in a hierarchical organization and the dataset contains no information on the data store. Furthermore, the adapter 1105 transforms the data between the organization of the data store 1120 and the hierarchical organization. Moreover, the data store 1130 has no information on the dataset 1120 and the data is retrieved from the data store 1130 by the adapter 1105. The data is pushed from the adapter 1105 to the dataset 1120. In one embodiment, the data store 1130 includes a database management system and the organization of the data store is a schema.

In another embodiment apparatus 1100 includes a second adapter 1110 and 1115 operably coupled by a communication line between the adapter 1105 and the data store 1130. The adapter 1105 is operably coupled by a communication line to the data store 1130 through the second adapter 1110 and 1115, for retrieving and sending data to the second adapter. The second adapter 1110 and 1115 transforms the data between the first organization and a native organization of the second adapter. The first adapter 1105 transforms the data between the native organization of the second adapter 1110 and 1115 and the hierarchical organization. The data store 1130 implements a programming model schema in which data is factored out of the model.

Figure 12:
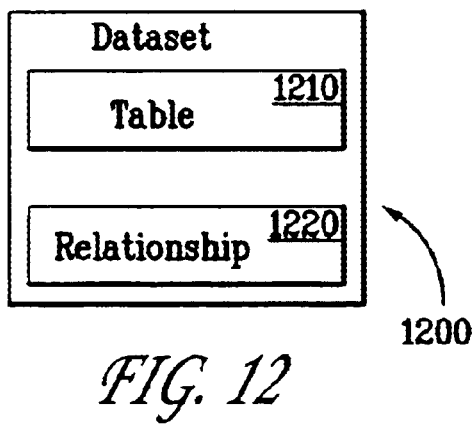
FIG. 12 is a diagram of an dataset data structure for use in an exemplary implementation of the invention.

FIG. 12 is a diagram of a dataset data structure 1200 for use in an exemplary implementation of the invention.

The data structure of dataset 1200, as in dataset 1120 in FIG. 11, is stored on computer-readable medium and includes at least one table object 1210 and at least one table relationship object 1220. The table 1210 is the implementation of the data in the dataset 1200. In one embodiment, the table is a typed column arrays (as opposed to variant row arrays), which is optimized for simple query processing like sorting and storage. In one embodiment, dataset 1200 is implemented as an encapsulated software object component, in which the table 1210 and the relationship object 1220 are attributes of the object. The dataset 1200 object provides an application program interface (A.P.I.) to the encapsulated attributes by using the interface classes as a type library. The dataset is not expressed in a "hardened" hierarchy. Rather, data that represents the hierarchy is stored in regular Table format. The perspective from which the code is written becomes the "hoist" for the data. For example, in a many to many relationship described below in conjunction with FIG. 15, a query for Teachers.teach.courseName could be made, which would describe a hoist on teachers, or a query for the Courses.employ.TeacherName which implements a hoist on Courses. In data hoisting, the fluid relationship of data is changed in response to current data needs.

Figure 13:
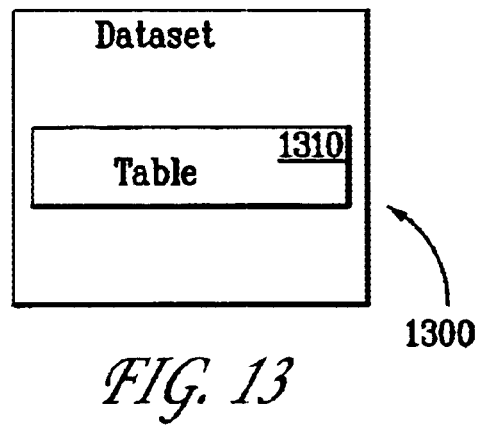
FIG. 13 is a diagram of a dataset data structure for use in an exemplary one-to-one implementation of the invention.

FIG. 13 is a diagram of a dataset data structure 1300 for use in an exemplary implementation of the invention.

In the case of regular data, or singular data, a dataset 1300 has one table 1310 of data within it.

Figure 14:
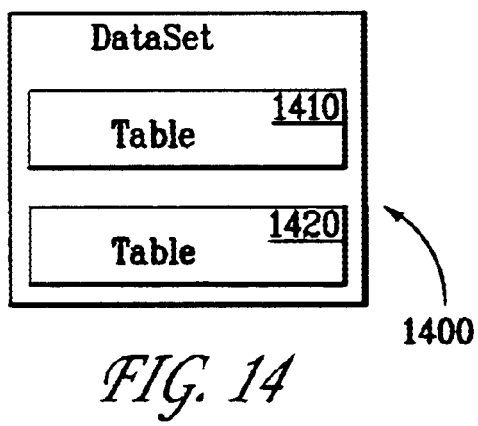
FIG. 14 is a diagram of a dataset data structure for use in an exemplary one-to-many relationship implementation of the invention.

FIG. 14 is a diagram of a dataset data structure 1400 for use in an exemplary one-to-many relationship implementation of the invention.

For the one-to-many relationship, the dataset 1400 includes a second table 1420 in addition to the first table 1410. A client accesses the data from either table, 1410 or 1420, to either table 1410 or 1420. Foreign key relations are maintained by the dataset 1400.

Figure 15:
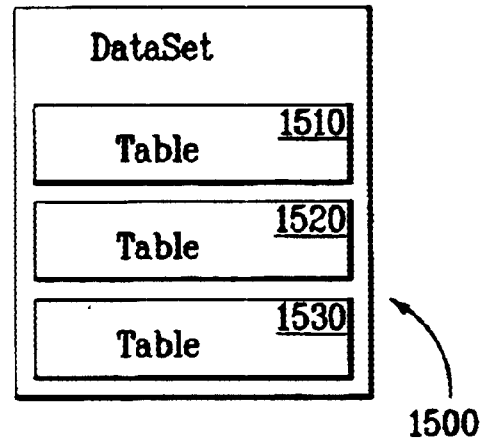
FIG. 15 is a diagram of a dataset data structure for use in an exemplary many-to-many relationship implementation of the invention.

FIG. 15 is a diagram of a dataset data structure 1500 for use in an exemplary many-to-many relationship implementation of the invention.

In the many-to-many relationship, two base data tables 1510 and 1520 are implemented in the relationship, as well as junction table 1530. The junction table 1530 is maintained by the data set.

FIG. 16 is a diagram of a table data structure in a dataset for use in an exemplary implementation of the invention.

Table 1600, as in table 1310 in FIG. 13, and 1410 and 1420 in FIG. 14, and 1510 and 1520 in FIG. 15, includes a data column object 1610.

Table 1600 also includes a data row object 1620, associated with a locally unique identification, and a data key object 1630.

FIG. 17 is a diagram of a data row object 1700 for use in an exemplary implementation of the invention.

The data row object 1700 as in data row object 1620 in FIG. 16, includes an error object 1710 that indicates whether or not the row is in error. The data row object 1700 also includes an item object 1720 that stores a value for the row. The data row object 1700 includes a row-state object 1730. The data row object 1700 includes a table object 1740.

FIG. 18 is a diagram of a data column object 1800 for use in an exemplary implementation of the invention.

The data column object 1800 as in data column object 1610 in FIG. 16, includes a column-name object 1805, an auto-increment object 1810, an auto-increment seed object 1815, an auto-increment step object 1820, a data-type object 1825, a default-value object 1830, a caption object 1835, an ordinal object 1840, an allow-null object 1845, a read-only object 1845, a maximum-length object 1850, a table object 1855, a unique object 1860, a value-editor object 1865, a sparse object 1870, an expression object 1875, and a metadata object 1880.

FIG. 19 is a diagram of additional table data structure 1900 in a dataset for use in an exemplary implementation of the invention.

Table 1900 includes a dataset-belongs object 1910, a display-expression object 1920, a has-errors object 1930, a minimum-capacity object 1940, an indexed-columns object 1950, a table-name object 1960, a metadata object 1970, and a unique column object 1980.

Figure 20:
FIG. 20 is a diagram of additional dataset data structure for use in an exemplary implementation of the invention.

FIG. 20 is a diagram of additional dataset data structure 2000 for use in an exemplary implementation of the invention.

The dataset object, as in data structure 1300, includes a collection object 2010, a name object 2020, a case-sensitive object 2030, a has-errors object 2040, a locale object 2050, and a metadata object 2060.

Figure 21:
FIG. 21 is a diagram of a collection object data structure for use in an exemplary implementation of the invention.

FIG. 21 is a diagram of a collection object data structure 2100 for use in an exemplary implementation of the invention.

The collection object, as in collection object 2010, includes an all-object 2110, a count object 2020, and an item object 2030.

Figure 22:
FIG. 22 is a diagram of a table relationship object data structure for use in an exemplary implementation of the invention.

FIG. 22 is a diagram of a table relationship object data structure 2200 for use in an exemplary implementation of the invention.

The table relationship object, as in table relationship object 1220, includes a relation-name object 2210, a constraint-enforce object 2220, a parent-table object 2230, a child-table object 2240, a parent-columns object 2250, a child-columns object 2260, and a cascade object 2270.

Conclusion

An architecture in which data is separated from database schema has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

More specifically, in computer-readable program embodiments of apparatus 800, 900, and 1000, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer as in computer 120 in FIG. 1, or on at least as many computers as there are components.

The terminology used in this application with respect to is meant to include all of these environments. Therefore, it is manifestly intended that this invention be limited only by the following claims and equivalents thereof.

We claim:

1. A computerized system comprising:
    a data store, having data in a first organization;
    a first adapter operably coupled to the data store, for retrieving and sending data to the data store; and
    a dataset operably coupled to the first adapter, the dataset having data in a hierarchical organization, the first adapter having information on the data store and the dataset, whereby the dataset need not have any of the information on the data store and the data store need not have any of the information on the dataset;
    wherein the first adapter transforms the data between the first organization and the hierarchical organization;
    wherein the data store has no information on the dataset; and
    wherein the data is retrieved from the data store by the first adapter, and the data is pushed from the first adapter to the dataset.

2. The computerized system as in claim 1, wherein the data store further comprises a database management system and the first organization further comprises a schema.

3. The computerized system as in claim 1, further comprising:
   a second adapter operably coupled between the first adapter and the data store; and
   wherein the first adapter is operably coupled to the data store through the second adapter, for retrieving and sending data to the second adapter; and
   wherein the second adapter transforms the data between the first organization and a native organization of the second adapter; and
   wherein the first adapter transforms the data between the native organization of the second adapter and the hierarchical organization.

* * * * *